United States Patent
Yadav

(10) Patent No.: US 7,232,556 B2
(45) Date of Patent: Jun. 19, 2007

(54) TITANIUM COMPRISING NANOPARTICLES AND RELATED NANOTECHNOLOGY

(75) Inventor: Tapesh Yadav, Longmont, CO (US)

(73) Assignee: NanoProducts Corporation, Longmont, CO (US)

( * ) Notice: Subject to any disclaimer, the term of this patent is extended or adjusted under 35 U.S.C. 154(b) by 189 days.

(21) Appl. No.: 10/948,650

(22) Filed: Sep. 24, 2004

(65) Prior Publication Data

US 2005/0191492 A1 Sep. 1, 2005

Related U.S. Application Data

(60) Provisional application No. 60/506,666, filed on Sep. 26, 2003.

(51) Int. Cl.
C01G 1/00 (2006.01)
C01G 23/00 (2006.01)
(52) U.S. Cl. ............... 423/592.1; 423/610; 423/593.1; 423/598; 423/594.3; 423/594.1; 423/594.5; 423/594.8; 423/594.12; 423/594.9; 423/594.7; 423/594.13; 423/600; 423/263; 423/594.14; 423/594.16; 423/411; 423/440; 423/492; 977/773; 977/775; 977/776

(58) Field of Classification Search ............... 423/610, 423/592.1, 593.1, 598, 594.3, 594.1, 594.5, 423/594.8, 594.12, 594.9, 594.7, 594.13, 423/600, 263, 594.14, 594.16, 411, 400, 492; 428/689, 702; 501/137, 138, 139; 502/350; 977/773, 775, 776; 106/31.13
See application file for complete search history.

(56) References Cited

U.S. PATENT DOCUMENTS

| | | | | |
|---|---|---|---|---|
| 4,851,206 A | * | 7/1989 | Boudart et al. | ............. 423/409 |
| 4,895,765 A | * | 1/1990 | Sue et al. | ................... 428/627 |
| 5,788,738 A | | 8/1998 | Pirzada et al. | |
| 5,851,507 A | | 12/1998 | Pirzada et al. | |
| 5,984,997 A | | 11/1999 | Bickmore et al. | |
| 6,228,904 B1 | | 5/2001 | Yadav et al. | |
| 6,344,271 B1 | | 2/2002 | Yadav et al. | |
| 6,503,475 B1 | * | 1/2003 | McCormick et al. | .... 423/592.1 |
| 6,607,821 B2 | * | 8/2003 | Yadav et al. | ................ 428/323 |
| 6,827,921 B1 | * | 12/2004 | Singhal et al. | .............. 423/598 |
| 2003/0143437 A1 | * | 7/2003 | Ohtsu et al. | ................ 428/701 |
| 2004/0202890 A1 | * | 10/2004 | Kutilek et al. | .............. 428/689 |

* cited by examiner

Primary Examiner—Timothy C. Vanoy
(74) Attorney, Agent, or Firm—Foley & Lardner LLP

(57) ABSTRACT

Nanoparticles comprising titanium, such as nanoscale doped titanium metal compounds, inorganic titanium compounds, and organic titanium compounds, their methods of manufacture, and methods of preparation of products from nanoparticles comprising titanium are provided.

16 Claims, 1 Drawing Sheet

TITANIUM COMPRISING NANOPARTICLES AND RELATED NANOTECHNOLOGY

CROSS-REFERENCE TO RELATED PATENT APPLICATIONS

The present application claims the benefit of provisional application No. 60/506,666 filed Sep. 26, 2003, which application is hereby incorporated by reference in its entirety.

The present invention relates to methods of manufacturing submicron and nanoscale doped or undoped powders comprising titanium and applications of such powders.

Nanopowders in particular and submicron powders in general are a novel family of materials whose distinguishing feature is that their domain size is so small that size confinement effects become a significant determinant of the materials' performance. Such confinement effects can, therefore, lead to a wide range of commercially important properties. Furthermore, since they represent a whole new family of material precursors where conventional coarse-grain physiochemical mechanisms are not applicable, these materials offer unique combination of properties that can enable novel and multifunctional components of unmatched performance. Yadav et al. in U.S. Pat. No. 6,344,271 and in co-pending and commonly assigned U.S. patent application Ser. Nos. 09/638,977 (now U.S. Pat. No. 6,569,397), Ser. No. 10/004,387 (now U.S. Pat. No. 6,652,967), Ser. No. 10/071,027 (now U.S. Pat. No. 6,719,821), Ser. No. 10/113,315 (now U.S. Pat. No.6,832,735), and Ser. No. 10/292,263 (now U.S. Pat. No. 7,029,507), which along with the references contained therein are hereby incorporated by reference in their entirety, teach some applications of sub-micron and nanoscale powders.

SUMMARY OF THE INVENTION

The present invention involves the methods for manufacturing nanoscale doped or undoped powders comprising titanium and applications thereof.

In some embodiments, the present invention provides nanoparticles comprising titanium and applications of such nanoparticles.

In some embodiments, the present invention provides methods for manufacturing doped or undoped substances comprising titanium.

In some embodiments, the present invention provides nanostructured composites and coatings comprising titanium.

In some embodiments, the present invention provides applications of nanoparticles comprising titanium compounds.

In some embodiments, the present invention provides novel color pigments for a variety of applications.

In some embodiments, the present invention provides novel catalysts for a variety of applications.

In some embodiments, the present invention provides novel additives for a variety of applications.

In some embodiments, the present invention provides novel materials and devices for optical, sensing, thermal, biomedical, structural, superconductive, energy, and security applications, as well as other applications.

In some embodiments, the present invention provides methods for producing novel doped or undoped nanoscale powders comprising titanium in high volume, low-cost, and reproducible quality.

DETAILED DESCRIPTION OF THE EXEMPLARY EMBODIMENTS

Figure 1:
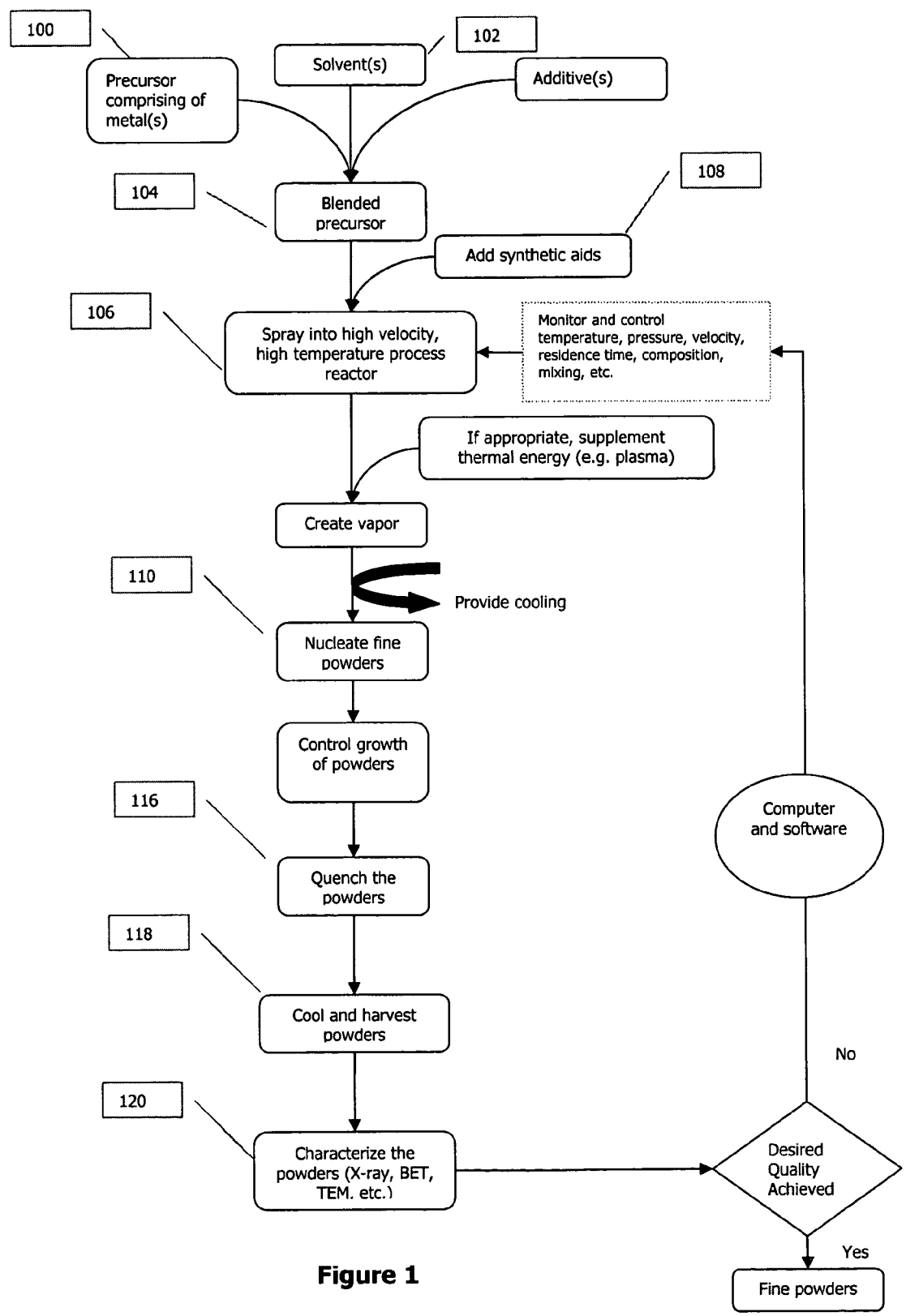
FIG. 1 shows an exemplary overall approach for producing submicron and nanoscale powders in accordance with the present invention.

This invention is generally directed to very fine powders of doped or undoped metal compounds, such as oxides, comprising Titanium (Ti). The scope of the teachings herein includes high purity powders. Powders discussed herein are of mean crystallite size less than 1 micron, and in certain embodiments less than 100 nanometers. Methods for producing and utilizing such powders in high volume, low-cost, and reproducible quality are also outlined.

Definitions

For purposes of clarity the following definitions are provided to aid understanding of the description and specific examples provided herein:

"Fine powders" as used herein, refers to powders that simultaneously satisfy the following criteria:
(1) particles with mean size less than 10 microns; and
(2) particles with aspect ratio between 1 and 1,000,000.

For example, in some embodiments, the fine powders are powders that have particles with a mean domain size less than 5 microns and an aspect ratio ranging from 1 to 1,000,000.

"Submicron powders" as used herein, refers to fine powders with a mean size less than 1 micron. For example, in some embodiments, the submicron powders are powders that have particles with a mean domain size less than 500 nanometers and an aspect ratio ranging from 1 to 1,000,000.

The terms "nanopowders," "nanosize powders," "nanoparticles," and "nanoscale powders" are used interchangeably and refer to fine powders that have a mean size less than 250 nanometers. For example, in some embodiments, the nanopowders are powders that have particles with a mean domain size less than 100 nanometers and with an aspect ratio ranging from 1 to 1,000,000. "Mean size" as the term is used herein refers to the average crystallite size calculated by Warren-Averbach method from the peak broadening of X-ray diffraction spectra of the powders. If the particle is amorphous or X-ray spectra of crystallites is not obtainable, the term refers to the equivalent spherical diameter calculated from the specific surface area of the powder. The X-ray spectra can be measured using X-ray diffractometer and surface area can be measured using Quantachrome® Surface Area Analyzer.

"Pure powders," as the term used herein, are powders that have composition purity of at least 99.9% by metal basis. For example, in some embodiments the purity is 99.99%. The purity can be measured by atomic absorption or plasma or other methods.

"Nanomaterials," as the term is used herein, are materials in any dimensional form and with domain sizes of less than 100 nanometers.

"Domain size," as that term is used herein, refers to the minimum dimension of a particular material morphology. For example, in the case of powders the domain size is the grain size. In the case of whiskers and fibers, the domain size is the diameter. In the case of plates and films, the domain size is the thickness.

The terms "powder," "particle," and "grain" are used interchangeably and include, but are not limited to, oxides, carbides, nitrides, borides, chalcogenides, halides, metals, intermetallics, ceramics, polymers, alloys, and combinations thereof. These terms include single metal, multi-metal (also known as mixed metal), and complex compositions. These terms further include hollow, dense, porous, semi-porous, coated, uncoated, layered, laminated, simple, complex, dendritic, inorganic, organic, elemental, non-elemental, composite, doped, undoped, spherical, non-spherical, surface functionalized, surface non-functionalized, stoichiometric, and non-stoichiometric forms or substances. Further, the term powder in its generic sense includes one-dimensional materials (fibers, tubes, etc.), two-dimensional materials (platelets, films, laminates, planar, etc.), and three-dimensional materials (spheres, cones, ovals, cylindrical, cubes, monoclinic, parallelolipids, dumbbells, hexagonal, truncated dodecahedron, irregular shaped structures, etc.).

"Aspect ratio," as the term is used herein, refers to the ratio of the maximum to the minimum dimension of a particle.

"Precursor," as the term is used herein, encompasses any raw substance that can be transformed into a powder of same or different composition. In certain embodiments, the precursor is a liquid. The term precursor includes, but is not limited to, organometallics, organics, inorganics, solutions, dispersions, melts, sols, gels, emulsions, or mixtures. In addition, the precursor may be a nanoparticle composition prepared using the teachings herein or some other method.

"Coating" (or "film" or "laminate" or "layer"), as the term is used herein, encompasses any deposition comprising submicron and nanoscale powders. The term includes in its scope a substrate, surface, deposition, or a combination that is hollow, dense, porous, semi-porous, coated, uncoated, simple, complex, dendritic, inorganic, organic, composite, doped, undoped, uniform, non-uniform, surface functionalized, surface non-functionalized, thin, thick, pretreated, post-treated, stoichiometric, or non-stoichiometric form or morphology.

"Dispersion," as the term is used herein, encompasses inks, pastes, creams, lotions, Newtonian, non-Newtonian, uniform, non-uniform, transparent, translucent, opaque, white, black, colored, emulsified, with additives, without additives, water-based, polar solvent-based, or non-polar solvent-based mixture of powder in any fluid or fluid-like state of substance.

This invention is specifically directed to submicron and nanoscale powders comprising doped or undoped titanium. Given the relative abundance of titanium in the earth's crust and current limitations on purification technologies, it is expected that many commercially produced materials would have naturally occurring titanium impurities. These impurities are expected to be below 100 parts per million, and in most cases, in concentration similar to other elemental impurities. Removal of such impurities does not materially affect the properties of interest to an application. For the purposes herein, powders comprising titanium impurities wherein titanium is present in concentration similar to other elemental impurities are excluded from the scope of this invention. However, it is emphasized that one or more doped or undoped titanium may be intentionally engineered into a powder at concentrations of 100 ppm or less, and these are included in the scope of the present invention.

In a generic sense, the invention teaches nanoscale powders, and in a more generic sense, submicron powders comprising at least 100 ppm by weight titanium (Ti), in some embodiments greater than 1 weight % by metal basis titanium (Ti), and in other embodiments greater than 10 weight % by metal basis titanium (Ti).

While several embodiments for manufacturing nanoscale and submicron powders comprising titanium are disclosed, for the purposes herein, the nanoscale or submicron powders may be produced by any method or may result as a byproduct from any process.

FIG. 1 shows an exemplary overall approach for the production of submicron powders in general and nanopowders in particular. The process shown in FIG. 1 begins with a titanium containing raw material. The raw material may be, but is not limited to, coarse powders, metal or alloy powders, salts, slurries, waste products, emulsions, organic compounds, or inorganic compounds. FIG. 1 shows one embodiment of a system for producing nanoscale and submicron powders in accordance with the present invention.

The process shown in FIG. 1 begins at 100 with a titanium metal-containing precursor, such as an emulsion, fluid, particle-containing suspension, liquid slurry, or water-soluble salt. The precursor may be evaporated metal vapor, evaporated alloy vapor, a gas, a single-phase liquid, a multi-phase liquid, a melt, a sol, a solution, fluid mixtures, or combinations thereof. The metal-containing precursor comprises a stoichiometric or a non-stoichiometric metal composition with at least some part in a fluid phase. In some embodiments, fluid precursors are used, while solid precursors may be used in other embodiments. However, fluids are typically easier to convey, evaporate, and thermally process, and the resulting product is typically more uniform.

In one embodiment, the precursors are environmentally benign, safe, readily available, high-metal loading, lower cost fluid materials. Examples of titanium metal-containing precursors suitable for purposes of the invention include, but are not limited to, metal acetates, metal carboxylates, metal ethanoates, metal alkoxides, metal octoates, metal chelates, metallo-organic compounds, metal halides, metal azides, metal nitrates, metal sulfates, metal hydroxides, metal salts soluble in organics or water, precursor powders, and metal-containing emulsions.

In another embodiment, multiple metal precursors may be mixed if complex nanoscale and submicron powders are desired. For example, a precursor comprising titanium, a precursor comprising nickel and a precursor comprising antimony may be mixed to prepare nickel antimony titanium oxide powders for pigment applications. As another example, a precursor comprising barium, precursor comprising strontium, and a precursor comprising titanium may be mixed in proportions readily determined by one of ordinary skill in the art to yield a high purity powder for dielectric applications, such as energy storage and insulation. As a further example, a precursor comprising potassium and a precursor comprising titanium may be mixed in various proportions to yield potassium titanate powders for IR reflection, insulation, and low thermal conductivity applications. In yet another example, a precursor comprising barium and a precursor comprising titanium may be mixed to yield barium titanium powders for piezo, ferroelectric, optical data storage, and electrical device applications. Such complex nanoscale and submicron powders can help create materials with surprising and unusual properties not available through the respective single metal oxides or a simple nanocomposite formed by physical blending powders of different compositions.

In another embodiment, a reactive or inert fluid such as solvent is added to the metal comprising precursor in order to modify the flow properties of the precursor or to change the particle characteristics.

In certain embodiments of this invention, it is desirable to use precursors of a higher purity to produce a nanoscale or submicron powder of a desired purity. For example, if purities greater than x % (by metal weight basis) are desired, one or more precursors that are mixed and used should have purities greater than or equal to x % (by metal weight basis).

With continued reference to FIG. 1, the metal-containing precursor 100 (containing one or a mixture of metal-containing precursors) is fed into a high temperature process 106 implemented using a high temperature reactor, for example. In one embodiment, a synthetic aid such as a reactive fluid 108 can be added along with the precursor 100 as it is being fed into the reactor 106. Examples of such reactive fluids include, but are not limited to, oxygen gas and air.

While the above examples specifically teach methods of preparing nanoscale and submicron powders of oxides, the teachings may be readily extended in an analogous manner to other compositions such as carbides, nitrides, borides, carbonitrides, and chalcogenides. While it is typical to use high temperature processing, a moderate temperature processing, or a low/cryogenic temperature processing may also be employed to produce the nanoscale and submicron powders of the present invention.

The precursor 100 may be also pre-processed in a number of other ways before the high temperature thermal treatment. For example, the pH may be adjusted to ensure stable precursor. Alternatively, selective solution chemistry, such as precipitation, with or without synthetic aids, such as surfactants, may be employed to form a sol or other state of matter. The precursor 100 may be pre-heated or partially combusted before the thermal treatment.

The precursor 100 may be injected axially, radially, tangentially, or at any other angle into the high temperature region 106. As stated above, the precursor 100 may be pre-mixed or diffusionally mixed with other reactants. The precursor 100 may be fed into the thermal processing reactor by a laminar, parabolic, turbulent, pulsating, sheared, or cyclonic flow pattern, or by any other flow pattern. In addition, one or more metal-containing precursors 100 can be injected from one or more ports in the reactor 106. The feed spray system may yield a feed pattern that envelops the heat source or, alternatively, the heat sources may envelop the feed, or alternatively, various combinations of this may be employed. In one embodiment, the feed is atomized and sprayed in a manner that enhances heat transfer efficiency, mass transfer efficiency, momentum transfer efficiency, and reaction efficiency. The reactor shape may be cylindrical, spherical, conical, or any other shape. Methods and equipment such as those taught in U.S. Pat. Nos. 5,788,738, 5,851,507, and 5,984,997, each of which is hereby incorporated by reference in full along with the references cited therein, can be employed in practicing the methods of this invention.

With continued reference to FIG. 1, after the precursor 100 has been fed into reactor 106, it is processed at high temperatures to form the product powder. The thermal treatment is done, in certain embodiments, in a fluid environment with the aim to produce a product, such as powders, that have the desired porosity, density, morphology, dispersion, surface area, and composition. This step produces by-products such as gases. To reduce costs, these gases may be recycled, mass/heat integrated, or used to prepare the pure gas stream desired by the process.

In embodiments using high temperature thermal processing, the high temperature processing may be conducted at step 106 (FIG. 1) at temperatures greater than 1500 K, in some embodiments greater than 2500 K, in some embodiments greater than 3000 K, and in some embodiments greater than 4000 K. Such temperatures may be achieved by various methods including, but not limited to, plasma processes, combustion, pyrolysis, electrical arcing in an appropriate reactor, internal energy, and combinations thereof. The plasma may provide reaction gases or may provide a clean (inert) source of heat. In the above embodiments, vapors of other elements may be added to the vapor comprising titanium to prepare complex compositions.

In the above embodiments, vapors of other elements may be added to the vapor comprising titanium to prepare complex compositions.

With continued reference to FIG. 1, the high temperature process 106 results in a vapor comprising the elements in the precursor. After the thermal processing, this vapor is cooled at step 110 to nucleate and grow submicron powders, in some embodiments nanopowders. In certain embodiments, the cooling temperature at step 110 is high enough to prevent moisture condensation. The dispersed particles form because of the thermokinetic conditions in the process. One of ordinary skill in the art may engineer the process conditions, such as pressure, residence time, supersaturation and nucleation rates, gas velocity, flow rates, species concentrations, diluent addition, degree of mixing, momentum transfer, mass transfer, and heat transfer, to tailor the morphology of the nanoscale and submicron powders. It is important to note that the focus of the process should be on producing a powder product that excels in satisfying the end application requirements and customer needs.

In certain embodiments, the nanopowder is quenched after cooling to lower temperatures at step 116 to minimize and prevent agglomeration or grain growth. Suitable quenching methods include, but are not limited to, methods taught in U.S. Pat. No. 5,788,738, which is hereby incorporated by reference in its entirety. In certain embodiments, sonic to supersonic quenching may be used. In other embodiments, coolant gases, water, solvents, cold surfaces, or cryogenic fluids might be employed. In certain embodiments, quenching methods are employed which can prevent deposition of the powders on the conveying walls. These methods may include, but are not limited to, electrostatic means, blanketing with gases (e.g. sweep), the use of higher flow rates, mechanical means, chemical means, electrochemical means, or sonication/vibration of the walls.

In some embodiments, the high temperature processing system includes instrumentation and software that can assist in the quality control of the process. Furthermore, in certain embodiments the high temperature processing zone 106 is operated to produce fine powders 120, in certain embodiments submicron powders, and in certain embodiments nanopowders. The gaseous products from the process may be monitored for composition, temperature, and other variables to ensure quality at step 112 (FIG. 1). The gaseous products may be recycled to be used in process 108 or used as a valuable raw material when nanoscale and submicron powders 120 have been formed, or they may be treated to remove environmental pollutants if any. Following quenching step 116, the nanoscale and submicron powders may be cooled further at step 118 and then harvested at step 120.

The product nanoscale and submicron powders 120 may be collected by any method. Suitable collection means include, but are not limited to, bag filtration, electrostatic separation, membrane filtration, cyclones, impact filtration, centrifugation, hydrocyclones, thermophoresis, magnetic separation, and combinations thereof. In one embodiment, a cake of the nanopowder is formed on the collection media, which then acts as an efficient collector capable of collecting with efficiencies greater than 95%, in certain embodiments greater than 99%.

The quenching at step 116 may be modified to enable preparation of coatings. In this embodiment, a substrate may be provided (in batch or continuous mode) in the path of the nucleating powder or quenching powder containing fluid flow or any other step. By engineering the substrate temperature and the powder temperature, a coating comprising the submicron powders and nanoscale powders can be formed on the substrate.

A coating, film, or component may also be prepared by dispersing the fine nanopowder and then applying various known methods such as, but not limited to, electrophoretic deposition, magnetophorectic deposition, spin coating, dip coating, spraying, brushing, screen printing, ink-jet printing, toner printing, and sintering. The nanopowders may be thermally treated or reacted to enhance their electrical, optical, photonic, catalytic, thermal, magnetic, structural, electronic, emission, processing, or forming properties before such a step.

The intermediate or product at any stage of the process, or similar process based on modifications by those skilled in the art, may be used directly as feed precursor to produce nanoscale or fine powders by methods such as, but not limited to, those taught in commonly owned U.S. Pat. Nos. 5,788,738, 5,851,507, 5,984,997, and co-pending U.S. patent application Ser. Nos. 09/638,977 (now U.S. Pat. No. 6,569,397) and Ser. No. 60/310,967 (now expired, each of which is hereby incorporated by reference in its entirety. For example, a sol may be blended with a fuel and then utilized as the feed precursor mixture for thermal processing above 2500 K to produce nanoscale simple or complex powders. In other embodiments, surfactants may be employed with the precursor. Synthetic aids help control of morphology, size, distribution, state, shape, surface and bulk composition, porosity and other characteristics of the powder.

In summary, one embodiment for manufacturing powders comprising titanium comprises (a) preparing a fluid precursor comprising at least 100 ppm by weight of titanium metal; (b) suspending and feeding the said precursor utilizing a gas, such as an inert, oxidizing, or reducing gas, into a high temperature reactor wherein the said precursor converts into vapor comprising titanium; (d) the vapor is cooled to nucleate submicron or nanoscale powders; (e) the powders are then quenched at gas velocities exceeding 0.1 Mach to prevent agglomeration and growth; and (f) the quenched powders are separated from the gases.

Another embodiment for manufacturing nanoscale powders comprising titanium comprises (a) preparing a fluid precursor comprising two or more metals, at least one of which is titanium, in a concentration greater than 100 ppm by weight; (b) suspending/atomizing and feeding the precursor into a high temperature reactor wherein the precursor converts into vapor comprising the titanium metal; (d) cooling the vapor to nucleate submicron or nanoscale powders; (e) quenching the powders at gas velocities exceeding 0.1 Mach to prevent agglomeration and growth; and (f) separating the quenched powders from the gases.

Yet another embodiment for manufacturing coatings comprises (a) preparing a fluid precursor comprising one or more metals, one of which is titanium; (b) feeding the precursor into a high temperature reactor wherein the precursor converts into vapor comprising the titanium; (d) cooling the vapor to nucleate submicron or nanoscale powders; (e) quenching the powders at gas velocities exceeding 0.1 Mach onto a substrate to form a nanostructured coating comprising titanium on the substrate.

The powders produced by the teachings herein may be modified by post-processing as taught by commonly owned U.S. patent application Ser. No. 10/113,315 (published as U.S. Pat. No. 6,832,735) which is hereby incorporated by reference in its entirety.

In other embodiments, solution approaches, such as those taught in co-pending and co-owned U.S. patent application Ser. No. 10/755,024, (publised as U.S. Pat. No. 2004-0139821 A1); may be employed. This application is hereby incorporated by reference in its entirety.

One embodiment using the solution approach to producing nanomaterial matter in general and titanium comprising nanoparticles in particular comprises (a) preparing a precursor comprising desired metal(s), such as titanium, in a solvent. The precursor may be a nitrate, halide, alkoxide, phosphate, sulfide, and the like such as those discussed herein; the solvent may be water, alcohols, ketones, aldehydes, ethers, acetates, glycols, glycerols, aromatic, aliphatic, polar, non-polar, ionic liquid, supercritical fluids, and the like such as those discussed herein. Mixtures of precursors and/or solvents may be used. Adding at least one synthetic aid, such as a surfactant, acid, alkali, supercritical fluid, organometallic and the like; (c) adding a reagent to the precursor wherein the reagent provides, or generates through physical process, such as desorption and the like, or creates through chemical/electrochemical reaction and the like, a precipitating species. The precipitating species may be $OH^-$, polyol, $H^+$, or an oxidizing, reducing, or complexing species. In some embodiments, the reagent and precursor are processed in a manner that provides plug flow index greater than 5 in some embodiments, greater than 50 in some embodiments; and greater than 500 in some embodiments. The term plug flow index is defined in U.S. patent application Ser. No. 10/755,024, (published as U.S. Pat. No. 2004-0139821 A1) which application is herein incorporated by reference in its entirety. In some embodiments, the reagent is added or created in a manner where the concentration of the precipitating species is less than or equal to the concentration of the reagent and where the availability of precipitating species is rate limiting or a significant contributor to the rate (contribution is greater than 5% in some embodiments and it is greater than 50% in some embodiments). In some embodiments, the availability of precipitating species is kinetically controlled or blocked (temperature, surfactant, silanes and the like) to make it rate limiting or contributing. (d) Letting the precipitating agent and precursor react and form nanoscale matter comprising the desired metal(s); and (e) collecting the product formed.

As an illustration, titanium comprising nanoparticles may be prepared from titanium chloride, titanium oxy nitrate, or titanium oxy chloride precursor by reacting it with urea solution wherein the urea is thermally decomposed by boiling the solution to yield $CO_2$, $NH_4^+$, and $OH^-$; the titanium precursor then reacts with the precipitating species to produce titanium comprising nanoparticles.

As another non-limiting illustration, titanium comprising nanoparticles may be prepared from titanium chloride or titanium alkoxide (or other) precursor by passing a solution comprising the precursor through an ion-exchange resin, such as in a column, typically a strong base resin, wherein the resin releases $OH^-$ species and exchanges it for $Cl^-$ species. The $OH^-$ precipitating species is released more homogeneously and at a rate such that nanoparticles of uniform size and other characteristics are formed and collected. The exhausted column may be regenerated and reused. In certain embodiments, organometallic coupling agents such as zirconium alkoxide, silanes, aluminum alkoxides and the like may be used to control, retard, or stop surface growth on one, several, or all grain boundaries of the nanoparticles' nucleation or grain growth.

As another non-limiting illustration, titanium comprising nanoparticles may be prepared from a salt precursor dissolved in a solvent; passing the solution comprising the precursor through an ion-exchange resin, such as in a column, typically a strong acid resin, wherein the resin releases a species, such as $H^+$ species, and exchanges it for another species, such as $Na^+$ species. The precipitating species is released more homogeneously and at a rate such that nanoparticles of uniform size and other characteristics are formed and collected. Plug flow is desirable in some embodiments. The product stream from the bed is a dispersion product useful to commerce. In other embodiments, the dispersion may be further processed to yield useful products. The exhausted column may be regenerated and reused.

Surfactants (or substances that react to one or more functional groups on the surface of the precipitating nanoscale powder may be combined with the solution prior to, during, or after precipitation or ion-exchange over adsorbents, resins, or chelating matter to control the characteristics and properties of the powder. Variables such as temperature, pressure, mixing, residence time, diluents, recycle rates, feed position, recycle position, reflux strategies, pH, composition, charge flow, voltage, and the like offer means to improve or modify the powder characteristics for specific applications. These variables may be readily adjusted by one of ordinary skill in the art to achieve desired characteristics. Solvents or synthetic aids may be employed that interact with the nanoparticle nucleation step and/or growth step or those that remove or chelate byproducts of the nanoparticle formation chemistry to assist the control of nanomaterial preparation. A non-limiting illustration of a substance that reacts with surface hydroxyl functional group is silanol comprising molecule.

The nanoparticles of the present invention may be reacted with other compounds to alter the surface characteristics of the nanoparticles or produce a new composition. For example, nanoparticles of the present invention may be reacted to form functional groups on the surface of the nanoparticles that are desirable for a specific application. In addition, nanoparticles may be used in reactions to produce new compositions. For example, the nanoparticles of the present invention may be used as catalysts, as discussed herein, or they may be used as reactants. The nanoparticles of the present invention may be reacted with a wide variety of compounds, such as, but not limited to, acids, bases, organics, inorganics, halogen containing compounds, oxygen containing compounds, silicon containing compounds, carbon containing compounds, and/or nitrogen containing compounds. The reactants may be in any form, such as solid, liquid, gas, plasma, slurry, emulsion, or sol.

Methods For Incorporating Nanoparticles Into Products

The submicron and nanoscale powders taught herein may be incorporated into a composite structure by any method. Some non-limiting exemplary methods are taught in commonly owned U.S. Pat. No. 6,228,904, which is hereby incorporated by reference in its entirety. In several embodiments, the nanoparticles comprising titanium may be processed and converted into an inorganic or organic composition/form before they are incorporated into a product, application, or device.

The submicron and nanoscale powders taught herein may be incorporated into plastics by any method. In one embodiment, a method of incorporating powders into plastics comprises (a) preparing nanoscale or submicron powders comprising titanium by any method; (b) providing powders of one or more plastics; (c) mixing the nanoscale or submicron powders with the powders of plastics; and (d) coextruding the mixed powders into a desired shape at temperatures greater than the softening temperature of the powders of plastics but less than the degradation temperature of the powders of plastics. In another embodiment, a masterbatch of the plastic powder comprising titanium metal containing nanoscale or submicron powders is prepared. These masterbatches can later be processed into useful products by techniques well known to those skilled in the art. In yet another embodiment, the titanium metal containing nanoscale or submicron powders are pretreated to coat the powder surface for ease in dispersability and to ensure homogeneity. In a another embodiment, injection molding of the mixed powders comprising nanoscale powders and plastic powders is employed to prepare useful products. In certain embodiments, the titania nanoparticle is surface functionalized with one or more functional groups that makes it more compatible with the plastic.

Another embodiment for incorporating nanoscale or submicron powders into plastics comprises (a) preparing nanoscale or submicron powders comprising titanium by any method; (b) providing a film of one or more plastics, wherein the film may be laminated, extruded, blown, cast, or molded; and (c) coating the nanoscale or submicron powders on the film by techniques such as spin coating, dip coating, spray coating, ion beam coating, and sputtering. In another embodiment, a nanostructured coating is formed directly on the film by techniques such as those taught herein. The grain size of the coating is less than 200 nm in some embodiments, less than 75 nm in some embodiments, and less than 25 nm in some embodiments. In certain embodiments, the titania nanoparticle is surface functionalized with one or more functional groups that makes it more compatible with the coating formulation and to reduce its photoactivity.

The submicron and nanoscale powders taught herein may be incorporated into glass by any method. In one embodiment, nanoparticles of titanium are incorporated in glass by (a) preparing nanoscale or submicron powders comprising titanium; (b) providing glass powder or melt; (c) mixing the nanoscale or submicron powders and the glass powder or melt; and (d) processing the glass comprising nanoparticles into articles of desired shape and size.

The submicron and nanoscale powders taught herein may be incorporated into paper by any method. In one embodiment, a method of incorporating submicron and nanoscale powders into paper comprises (a) preparing nanoscale or submicron powders comprising titanium metals; (b) providing paper pulp; (c) mixing the nanoscale or submicron powders with the paper pulp; and (d) processing the mixed powders into paper by steps such as molding, couching, and calendering. In yet another embodiment, the titanium metal containing nanoscale or submicron powders are pretreated to coat the powder surface for ease in dispersability and to ensure homogeneity. In another embodiment, nanoparticles are applied directly on the manufactured paper or paper-based product; the small size of nanoparticles enables nanoparticles to permeate through the paper fabric and thereby functionalize the paper. In another embodiment, the nanoparticles remain on the surface of the paper thereby functionalizing the paper.

The submicron and nanoscale powders taught herein may be incorporated into leather, fibers, fabric, or wood by any method. In one embodiment, the method comprises (a) preparing nanoscale or submicron powders comprising titanium; (b) providing leather, fibers, fabric, or wood; (c) bonding the nanoscale or submicron powders with the leather, fibers, fabric, or wood; and (d) processing the bonded leather, fibers, fabric, or wood into a product. In yet another embodiment, the titanium metal containing nanoscale or submicron powders are pretreated to coat the powder surface for ease in bonding or dispersability or to ensure homogeneity. In a further embodiment, nanoparticles are applied directly on a manufactured product based on leather, fibers, fabric, or wood; the small size of nanoparticles enables them to permeate through the leather, fibers (polymer, wool, cotton, flax, animal-derived, agri-derived), or fabric and thereby functionalize the product.

The submicron and nanoscale powders taught herein may be incorporated into pastes, creams, or inks by any method. In one embodiment, the method comprises (a) preparing nanoscale or submicron powders comprising titanium; (b) providing a formulation (paste, cream, ink, etc.); and (c) mixing the nanoscale or submicron powders with the formulation. In yet another embodiment, the titanium metal containing nanoscale or submicron powders are pretreated to coat the powder surface for ease in dispersability and to ensure homogeneity. In a further embodiment, a pre-existing formulation (e.g. cream or ink) is mixed with nanoscale or submicron powders to functionalize the cream or ink.

Nanoparticles comprising titanium can be sometimes difficult to disperse in water, solvents, plastics, rubber, glass, paper, etc. The dispersability of the nanoparticles can be enhanced by surface composition control, such as treating the surface of the titanium oxide powders or other nanoparticles comprising titanium with organic, inorganic, or organometallic species or by treating it thermally in a reactive or inert atmosphere. To illustrate, but not limit, fatty acids (e.g. propionic acid, stearic acid, and oils) or cationic or anionic dispersants can be applied to or with the nanoparticles to enhance the surface compatibility. If the powder has an acidic surface, ammonia, quaternary salts, or ammonium salts can be applied to the surface to achieve desired surface pH. In other cases, acetic acid wash can be used to achieve the desired surface state. Trialkyl phosphates and phosphoric acid can be applied to enhance processability.

Applications of Nanoparticles and Submicron Powders Comprising Titanium Elements Pigments Nanoparticles of titanium containing multi-metal oxides offer some surprising benefits as pigments. Nanoparticles are smaller than the visible wavelengths of light which leads to visible wavelengths interacting in unusual ways with the nanoparticles compared to particles with grain size much bigger than the visible wavelengths (400–700 nm). Their small size can also lead to more uniform dispersion. However, it is important in certain embodiments that the nanoparticles be non-agglomerated, i.e., do not have sintered neck formation or hard agglomeration. In some embodiments, nanoparticles have clean surfaces and in other embodiments, a surface modified or functionalized to enable bonding with the matrix in which they need to be dispersed.

One of the process challenges for manufacturing inorganic pigments is the ability to ensure homogeneous lattice level mixing of elements in a complex multi-metal formulation. One of the several unique features of the process described herein is its ability to prepare complex compositions with the desired homogeneity. Therefore, the teachings contained herein are suitable for creating color and commercially suitable pigment nanoparticles comprising titanium.

Some non-limiting illustrations of nanopigments comprising titanium are rutile, anatase, brookite, and mixed phase forms of pure titania. Each of these phases exhibits different densities, refractive indices, and photoactivity. The surprising benefit of titania nanoparticles is that the degree of transparency to visible light and its ability to absorb ultraviolet (e.g. UV-A, UV-B) wavelengths can be tailored by varying the crystallite size of the particle. For applications requiring transparent titania with UV absorbing properties, nanoparticles within crystallite size less than 60 nanometer are used in some embodiments. For applications requiring translucent titania with UV absorbing properties, nanoparticles within crystallite size in the range of 60 nanometers to 200 nanometers are used in some embodiments, and for a strong hiding power white color particles between 200 to 400 nanometers are used in certain embodiments.

For self-cleaning, photocatalytic, and photovoltaic applications, nanoparticles with size less than 100 nanometers are useful in certain embodiments, and a layer comprising nanoparticles arranged in a size gradient manner are useful in certain embodiments.

In some applications, phase of the titania produced is important. This can be engineered by a number of ways. For example, pure rutile nanoparticles can be produced by tailoring variables, such as, but not limited to, the raw material composition, pH, process temperature, residence time, dopant type, and concentration. As a specific non-limiting example, rutile nanoparticles can be produced by incorporating aluminum or rare earths as dopant during titania synthesis at temperatures above 1000° C. The dopant levels should be kept as low as feasible (less than 10 atom % on metal basis), but higher levels may be used to achieve desired results.

In other applications, nickel and antimony doped titanium nanoparticles prepared by methods taught herein can provide a transparent buff color. Iron titanium oxide nanoparticles, similarly can yield red to brown color pigments depending on relative loading of iron and titanium in the oxide particles. Combining titanium with rare earth elements (particularly La, Y, Ce, Pr, Nd, Sm, Eu, Gd, Tb, Dy) and other elements (e.g. Mn, Cr, Co, Zn) can yield a wide range of color nanopigments that are transparent and exhibit high color strength. Additionally such nanopigments offer infrared reflective characteristics useful in heat management coating and related applications.

A surprising benefit of nanoscale titanium comprising pigments is the unusual combination of color performance and hiding power in combination with reliable dispersability. Such stable dispersions are particularly useful in high speed ink jet printing applications or wherever dispersion uniformity and stability is very important. Some of the benefits of using nanoparticles in general and nanoparticles comprising of titanium in particular are the high surface reactivity, high surface area, superior lattice level homogenization, faster mass transfer, higher process kinetics, and lower processing times. Such benefits can be realized with titanium comprising nanoparticles with specific surface area greater than 10 $m^2$/gm in some embodiments, and greater $m^2/gm$ in some embodiments. One embodiment for manufacturing a pigmented product comprises (a) preparing nanoscale or submicron powders comprising titanium; (b) providing powders of one or more plastics; (c) mixing the nanoscale or submicron powders comprising titanium with the powders of plastics; and (d) processing the mixed powders into the product. In another embodiment, the titanium metal containing nanoscale or submicron powders are pretreated to coat the powder surface for ease in dispersability and to ensure homogeneity. In a further embodiment, extrusion or injection molding of the mixed powders comprising nanoscale powders and plastic powders can be employed to prepare useful products.

Coatings and Polishing

In certain embodiments, nanoparticles comprising titanium are incorporated as films or coatings. Multi-metal oxides comprising of titanium are useful in certain embodiments when photocatalytic activity of titanium oxide is not desired or when the properties of pure titanium oxide are inadequate for a specific application. For example, titanium silicon oxide nanoparticles offer optical and other properties that bridge those of pure silicon oxide and titanium oxide. Such variations can help the preparation of novel coatings, optical components, and fillers.

In certain embodiments, intentional amounts of additional elements may be combined with titanium to yield nanostructured substances with unique optical properties. For example, nanoparticles of titanium silicon oxide, wherein titanium and silicon atoms are mixed at lattice level in a molar ratio between 999:1 and 1:999, respectively, offer optical and other properties that bridge those of pure silicon oxide and titanium oxide. Such variations can help the preparation of novel optical components, additives, and numerous other products.

A non-limiting embodiment consistent with teachings herein for a method for preparing superior coating products comprises (a) preparing nanoscale powders comprising titanium; (b) homogeneously applying the nanoscale or submicron powders on a substrate by screen printing, ink jet technique, doctor blading, phoresis, spraying, painting, sheet curtaining, dip coating or other such techniques, (c) curing the applied powders into the desired product. The product may be heat treated between 500 K to 2000 K in an oxidizing or another controlled environment to achieve desired combination of properties.

Structural Additives

Nanoparticles comprising titanium are useful additives to plastics, metals, and also to various devices. The small size, confinement driven properties, high surface reactivity, and lower temperature sinterability of nanoparticles comprising titanium offer a unique opportunity to prepare hard plastics, scratch resistant surface coatings, and dispersion strengthening of metals and alloys. In these and similar applications, nanoparticles comprising titanium may be dispersed as an additive into a matrix, such as plastic, gel, metal, alloy, etc. yielding a nanocomposite masterbatch. The nanocomposite may be heat treated in a controlled atmosphere and a controlled thermodynamic or kinetic profile to further refine the performance of the nanocomposite.

Titanium comprising oxide nanoparticles offer another unusual advantage. The UV absorption properties can reduce the degradation of the matrix. For structural, optical, thermal, and coating applications, this is a significant advantage because of inherent degradation of these matrices while in use. Titanium comprising nanoparticles can be applied in the bulk of the matrix and/or on the surface.

One embodiment for preparing nanoscale additives comprises (a) preparing phase stabilized nanomaterials comprising titanium, (b) homogeneously mixing the nanoscale powders in a plastic, metal, alloy, paste, slip, tape, or solvent, and (c) forming the mix into the desired product. In some embodiments, the nanoscale powders as additives have a surface area greater than 25 $m^2/gm$ and are confined to a dimension that is 50% or less than the domain size of the matrix they are mixed into. The nanoscale additive, in another embodiment, is also heat treated between 500 K to 2000 K in an oxidizing, reducing, or other controlled environment to achieve a desired combination of properties.

Electroceramics

Nanoparticles comprising titanium offer several unusual benefits to electroceramic applications. These benefits are a consequence of a combination of one or more of various factors, such as (a) the small size of nanoparticles which can enable very thin film devices, (b) high surface area which can lower the sintering temperatures and sintering times, and (c) unusual grain boundary effects leading to unusual changes in the properties such as the dielectric property. These properties can be used to prepare electroceramic devices such as capacitors, piezoelectric devices, ferroelectric devices, batteries, photo-activated devices, varistors, and sensing devices (e.g. oxygen sensors).

A few non-limiting specific examples of nanoparticle compositions are

1. $M_xTiO_z$, where M is any element from the group—Ba, Sr, Ca, Nd, Ce, Pr, Sm, La, Y, Mg, Gd, Dy, Eu, Tb, Zr, Pb, Bi, V, Co, Cu, Fe, Ni, Ag, Zn, Mo, Sn, Sb, In, Al, Si, Ga, Nb, Ta, W, Hf), x is greater than 0.01 but less than 10, and z is a number that provides charge balance to the composition of matter. Non-stoichiometric compositions are useful in a number of applications.
2. $M_xN_yTiO_z$, where M and N are any elements from the group—Ba, Sr, Ca, Nd, Ce, Pr, Sm, La, Y, Mg, Gd, Dy, Eu, Th, Zr, Pb, Bi, V, Co, Cu, Fe, Ni, Ag, Zn, Mo, Sn, Sb, In, Al, Si, Ga, Nb, Ta, W, Hf), x is greater than 0.01 but less than 10, y is greater than 0.01 but less than 10, and z is a number that provides charge balance to the composition of matter. Non-stoichiometric compositions are useful in a number of applications.

In another embodiment, nanoparticles comprising of titanium with three or more additional elements are employed to achieve novel properties.

Functional Additives

Nanoparticles comprising titanium are useful functional additives to adhesives, sealants, pastes, inks, resins, etc. The small size, confinement driven properties, high surface reactivity, and other such characteristics offer several surprising and useful opportunities.

In one embodiment, nanoparticles comprising titanium are added to an adhesive in concentrations greater than 0.1 weight % to reduce water sensitivity by 1% or greater and to enhance adhesion of aqueous adhesive formulations by 1% or greater over those achievable in the adhesive without any additive comprising titanium.

In yet another embodiment, titanium comprising nanoparticles are added to a printing ink in concentrations greater than 0.1 weight % as a UV resistance promoter or to enhance at least one of the characteristic selected from the group—solvent resistance, scratch resistance, thermal resistance, adhesion to a substrate (plastic, paper, metal, glass)—wherein the characteristic is improved by 1% or greater over those achievable in the ink without any titanium comprising additive. Alternatively, titanium comprising nanoparticles are coated onto or formulated into paper stock to enhance the light and thermal durability, appearance, or printing properties of the paper.

In further embodiment, titanium comprising nanoparticles are added to fluids such as paints, oil recovery fluids, etc. in concentrations greater than 0.1 weight % to improve the UV resistance of the fluid over the UV resistance in the fluid without any titanium comprising additive.

In a further embodiment, titanium comprising nanoparticles are added to fluids, such as paints, oil recovery fluids, etc., in concentrations greater than 0.1 weight % to improve the rheology of the fluid over those in fluids without any additive comprising titanium.

In other embodiments, titanium comprising nanoparticles are added as additives or coatings in adhesives, paints, dispersions, slips, textiles, wool, ceramic, tapes, and devices to modify one or more of the optical, thermal, flame proofing, water proofing, dielectric, piezo, or ferroelectric properties of a matrix as a function of temperature, voltage, and/or pressure. The small size and high surface reactivity of nanoparticles offers the ability to enhance homogeneity, reliability, and product performance.

Catalysts

Titanium comprising substances are well established in commercial catalysis industry. Vanadium titanium oxides are used as oxidation catalyst formulations. Tungsten titanium oxides are used as reduction catalysts particularly in NOx treatment. There are several reports on the use of titanium oxide as photocatalysts and electrochemical catalysts. However, the surface area and surface characteristics achievable particularly in doped forms of nanoparticles comprising titanium with current technologies are limited. Nanoparticles taught herein offer means to overcome these limitations. The present invention offers nanoparticles with higher surface areas, favorable distribution between rutile and anatase phase, active surfaces, and improved selectivity. In certain embodiments, nanoparticles comprising titanium taught herein offer greater than 70 $m^2/gm$ of surface area, rutile content greater than 1% by weight, and a hydroxyl rich surface area. These hydroxyl functional groups on the surface are, in some embodiments, reacted with other substances thereby converting them to other functional groups, such as halides, phosphates, organic, silicon comprising, nitrates, carbonyls and the like.

One embodiment for manufacturing an effective catalyst comprises (a) preparing a fluid precursor comprising one or more elements, one of which is titanium; (b) feeding the precursor into a high temperature reactor; (c) wherein, in the high temperature reactor, the precursor is converted partly or completely into a vapor comprising titanium and wherein the vapor velocity at a certain point in the process is greater than 0.05 mach and in some embodiments greater than 0.25 mach; (d) cooling the vapor to nucleate submicron or nanoscale powders comprising titanium; the stream comprising nanopowder is then quenched and harvested; and (e) using the harvested submicron or nanoscale powders comprising titanium as a wash coat on catalyst substrates or as catalysts or both.

As wash coats, additives, support, or combinations thereof, nanoparticles comprising titanium offer a thermal and hydrothermal stability that is at least 5% higher than those achievable without any wash coat comprising titanium nanoparticles. In general, titanium comprising nanoparticles taught herein offer an unusual method of stabilizing the surface area and catalytic activity over time of any catalyst that degrades due to the effects of sintering at temperatures above 500° C. without the presence of titanium.

The catalyst powders described above can be combined with zeolites and other well defined porous materials to enhance the selectivity and yields of useful chemical reactions.

Reagent and Raw Material for Synthesis

Nanoparticles comprising titanium, such as titanium containing multi-metal oxide nanomaterials, are useful reagents and precursors to prepare other organic or inorganic compositions of nanoparticles comprising titanium. In a generic sense, nanoparticles comprising titanium are reacted with another compound, such as, but not limited to, an acid, alkali, gas, plasma, solid, liquids, or solvent. The high surface area of nanoparticles facilitates the reaction, and in certain embodiments, the products resulting from this reaction are also nanoparticles of various shapes, forms, and morphologies. These product nanoparticles can then be suitably applied or utilized to catalyze or used once again as reagents to prepare other fine chemicals. A few non-limiting illustrations utilizing nanoparticles comprising titanium follow. These teachings can be extended to other compositions such as titanium nitrate and organometallics based on titanium.

One synthesis embodiment for a method for producing reagent or complex nanoparticles comprising titanium comprises (a) preparing a fluid precursor comprising one or more elements, one of which is titanium (illustrative fluid precursors are titanium octoate, titanium chloride, titanium nitrate, and DuPont® Tyzor®); (b) feeding the precursor into a high temperature reactor operating at temperatures greater than 1500 K in certain embodiments, greater than 2500 K in certain embodiments, and greater than 4000 K in certain embodiments; (c) wherein, in the high temperature reactor, the precursor is converted into a vapor comprising stream wherein the stream velocity is maintained at velocities at one or more stages greater than 0.05 mach and in certain embodiments greater than 0.25 mach; (d) the vapor is cooled, quenched, and harvested to yield submicron or nanoscale powders comprising titanium; and (e) the powders are reacted with a gas, liquid, solution, solid, plasma, or any other substance to yield titanium comprising substance.

Titanium Nitride: Titanium oxide nanoparticles are reacted with nitrogen and carbon in an inert atmosphere above 1000° C. to form titanium nitride and carbon monoxide. A non-limiting synthesis embodiment consistent with teachings herein for a method for producing nanoparticles comprising titanium and nitrogen comprises (a) preparing nanoscale powders comprising of titanium; (b) reacting the nanoscale powders with nitrogen comprising fluid, in certain embodiments also in the presence of carbon; and (c) collecting resultant nanoparticles comprising titanium and nitrogen. These materials are useful as wear coatings, tools, component fabrication, color pigments, and various structural and thermal applications. In another embodiment, titanium metal nanoparticles are reacted with nitrogen or ammonia in a thermal process to yield titanium nitride nanoparticles with size less than 100 nm. The presence of hydrogen in such a process is useful in some embodiments. Alternatively, titanium nitride is produced using the teachings herein wherein gases comprising of titanium chloride and nitrogen or ammonia or both, in certain embodiments with hydrogen present, are fed to the thermal process at high velocities to yield titanium nitride nanoparticles.

Titanium Sub Oxides: Titanium oxide nanoparticles are reacted and reduced with hydrogen or other reducing fluids to yield titanium sub oxide nanoparticles. The reaction is performed at moderate temperatures (between 500° to 1200° C.) to take advantage of unusual reactivity of titanium oxide nanoparticles to yield titanium sub oxide nanoparticles with size less than about 100 nm. Titanium sub oxide nanoparticles offer commercially valuable characteristics in coating and conductive fillers.

Multimetallic nanoparticles comprising titanium: Titanium comprising nanoparticles or titanium oxide nanoparticles can be reacted at moderate temperatures (200° C. to 1100° C.) with alkali metal hydroxide, carbonate, or oxide. In certain embodiments, the later are in nanoparticle form to yield alkali metal titanate nanoparticles. The surprising benefit is the lower reaction temperatures over those necessary for coarse micron sized particles. Lower temperature means lower energy consumption and costs and lower consequential environmental impact. Specific examples of substances that can be produced include lithium titanium oxides, sodium titanium oxides, and potassium titanium oxides. Titanium comprising nanoparticles or titanium oxide nanoparticles can be reacted at moderate temperatures (200° C. to 1150° C.) with alkaline metal hydroxide, carbonate, or oxide, in certain embodiments the later are in nanoparticle form to yield alkali metal titanate nanoparticles. The surprising benefit is the lower reaction temperatures over those necessary for coarse micron sized particles. Lower reaction temperature means lower energy consumption and costs and lower consequential environmental impact. Specific examples of substances that can be produced include barium titanium oxides, magnesium titanium oxides, calcium titanium oxides, and strontium titanium oxides. These compositions are useful as electroceramic materials, pigments, UV absorbing additives, dopants, gems, PTC resistors, barrier layer materials, energy storage, etc. Aluminum titanate powders can be made from aluminum oxide and nanoparticles of titanium oxide by thermal driven reaction below 1280° C. The surprising benefit is the lower reaction temperatures over those necessary for coarse micron sized particles. Other powders that can be produced in this manner with attractive manufacturing economics include iron titanate, lead titanate, nickel titanate, zinc titanate, and rare earth titanates.

Titanium Carbide: In one embodiment, titanium oxide nanoparticles are reacted and reduced with carbon in a carbothermic furnace to yield titanium carbide nanoparticles or submicron particles. The carbothermic reaction may be performed at lower temperatures to take advantage of unusual reactivity of titanium oxide nanoparticles to yield titanium carbide nanoparticles with size less than 100 nm.

Alternatively, titanium carbide is produced using the teachings herein wherein gases comprising the precursors titanium chloride and methane, sometimes with hydrogen present, are fed to the thermal process at high velocities to yield titanium carbide nanoparticles.

In another embodiment, titanium metal nanoparticles are reacted with carbon in a thermal process to yield titanium carbide nanoparticles. Temperatures above 400° C. are useful in certain embodiments.

Titanium carbide nanoparticles are commercially valuable as coatings and as hard melting carbide fillers. They offer effective performance in applications wherein currently titanium carbide powders of size greater than 0.5 microns are used.

Titanium Halides: In one embodiment, titanium oxide nanoparticles are reacted with dry silicon tetrafluoride to yield titanium tetrafluoride nanoparticles. It is important to note that the reaction is performed at low temperatures and in absence of water vapor to take advantage of unusual reactivity of titanium oxide nanoparticles. In the presence of water vapor, the titanium tetrafluoride nanoparticles are converted to titanium oxide. In another embodiment, titanium oxide nanoparticles are first reacted with dilute hydrofluoric acid and thereafter neutralized with an alkali such as potassium hydroxide solution to prepare brilliant white nanocrystals of potassium fluorotitanate. Such nanocrystals are particularly useful in grain refining for aluminum and aluminum alloys, dental fillings, in grinding wheels, and other similar applications.

Titanium oxide nanoparticles may be reacted with chlorine gas in the presence of carbon, in certain embodiments, at temperatures above 600 C to yield titanium chloride. While this process is already in wide use with coarser titanium oxide powders, the use of nanoparticles can enable faster reaction given the higher surface area of titanium oxide nanoparticles. Titanium chlorides are useful materials in the synthesis of titanium trichloride catalysts, esters of titanic acid and other compounds. These compounds comprising titanium can be further reacted with other substances to produce additional useful thin film, coating, and bulk products, in certain embodiments with nanostructured confinement.

Surface treated titanium comprising nanoparticles: In one embodiment, titanium comprising nanoparticles or titanium oxide nanoparticles can be surface reacted and functionalized by first dispersing the nanoparticles in a solvent, adding another species, such as an acid (sulfuric, nitric, hydrochloric, hydrobromic, acetic, formic, acetic, lactic, benzoic, phosphoric, etc.), or a base (ammonia, sodium hydroxide, etc.), or a surface reactive compound (silanes, alkoxides, chlorides), or a surfactant or dispersant, or other such species to the said dispersion, and then post processing such a dispersion through a mixer, homogenizer, drier, or thermal treatment. The post processing, in certain embodiments, is performed in a closed or open thermodynamic system wherein state variables, such as temperature, pressure, phases, species, charge, space velocities, species concentrations, and compositions, are monitored at desired values. Such nanoparticles are useful as catalysts and in preparation of inks, adhesives, dispersions, and the like.

EXAMPLE 1

Titanium Oxide Powders 99 weight % by metal pure Titanium Tyzor TOT® precursor from DuPont was diluted with 20% by volume hexane from Ashland Chemicals. This mix was sprayed into a DC thermal plasma reactor at a rate of about 80 ml/min using about 145 standard liters per minute oxygen. The peak vapor temperature in the thermal plasma reactor, processed at velocities greater than 0.25 mach, was above 3000 K. The vapor was cooled and then quenched by Joule-Thompson expansion. The powders collected were analyzed using X-ray diffraction (Warren-Averbach analysis) and BET surface area analyzer. It was discovered that the powders had a crystallite size of less than 50 nm, of pure anatase phase, and a specific surface area of greater than 25 $m^2$/gm. Next, in a separate run with the same process, the mix was sprayed at a rate of about 50 ml/min using about 280 standard liters per minute oxygen. The peak temperature in the thermal plasma reactor was above 3000 K. The vapor was cooled and then quenched by Joule-Thompson expansion. The powders collected were analyzed using X-ray diffraction (Warren-Averbach analysis) and BET. It was discovered that the powders had a crystallite size of less than 10 nm, anatase phase, and a specific surface area of about 100 m$^2$/gm. These examples show that nanoparticles comprising of titanium can be prepared and that the characteristics of titanium oxide powder can be varied with process variations.

EXAMPLE 2

Rutile Rich Titanium Oxide Powders 99 weight % by metal pure Titanium Tyzor NPT® precursor from DuPont was diluted with 20% by volume hexane from Ashland Chemicals. This mix was sprayed into a thermal plasma reactor described above at a rate of about 60 ml/min using about 335 standard liters per minute oxygen. The peak vapor temperature in the thermal plasma reactor, processed at velocities greater than 0.25 mach, was above 3000 K. The vapor was cooled to nucleate and grow the particles and then quenched by Joule-Thompson expansion. The powders collected were analyzed using X-ray diffraction (Warren-Averbach analysis) and BET surface area analyzer. It was discovered that the powders had a crystallite size of less than 40 nm, had rutile to anatase phase in 2:1 ratio, and a specific surface area of greater than 30 m$^2$/gm.

Examples 1 and 2 show that nanoparticles comprising titanium can be prepared and that the characteristics of titanium oxide powder can be varied with process variations.

EXAMPLES 3

Barium Strontium Titanium Oxide Powders

Barium Plastistab® precursor from OM Group, Inc., Strontium 10 HexCem® from OM Group, Inc. and Titanium Tyzor® from DuPont were mixed by weight such that the metal content of Ba:Sr:Ti were in 0.5:0.5:1.0 molar ratios. The mix was diluted with isopropyl alcohol till the viscosity of the precursor was less than 100 cP. This mix was sprayed into a thermal plasma reactor described above at a rate of about 75 ml/min using about 150 standard liters per minute oxygen. The peak vapor temperature in the thermal plasma reactor, processed at velocities greater than 0.25 mach, was above 3000 K. The vapor was cooled and then quenched by Joule-Thompson expansion. The powders collected were analyzed using X-ray diffraction (Warren-Averbach analysis) and BET. It was discovered that the powders had a crystallite size of less than 100 nm and a specific surface area of greater than 20 m$^2$/gm. The powder matched the expected peaks for barium strontium titanium oxide and had no detectable levels of barium oxide, strontium oxide or titanium oxide.

This example shows that complex multi-metal nanoparticles comprising titanium can be prepared using the teachings herein.

EXAMPLE 4

Zinc Titanium Oxide Nanomaterials 99.9 weight % by metal pure Titanium Tyzor® precursor from DuPont was mixed with Zinc octoate from Shepard Chemicals (Zn:Ti ratio of 2:1), which was then diluted with hexane until the viscosity of the precursor was less than 100 cP. This mix was sprayed into a thermal plasma reactor described above at a rate of about 50 ml/min using about 125 standard liters per minute oxygen. The peak vapor temperature in the thermal plasma reactor, processed at velocities greater than 0.25 mach, was above 3000 K. The vapor was cooled and then quenched by Joule-Thompson expansion. The powders collected were analyzed using X-ray diffraction (Warren-Averbach analysis) and BET. It was discovered that the powders matched the expected diffraction spectra for $Zn_2TiO_4$, had a crystallite size of less than 25 nm and a specific surface area of greater than 50 m$^2$/gm.

EXAMPLE 5

Cerium Titanium Oxide Nanomaterials 99.9 weight % by metal pure Titanium Tyzor® precursor from DuPont was mixed with cerium 2-ethyl hexanoate, which was then diluted with hexane until the viscosity of the precursor was less than 100 cP. This mix was sprayed into a DC thermal plasma reactor described in Example 1 at a rate of about 70 ml/min using about 280 standard liters per minute oxygen. The peak vapor temperature in the thermal plasma reactor, processed at velocities greater than 0.25 mach, was above 3000 K. The vapor was cooled to nucleate nanoparticles which were then quenched by Joule-Thompson expansion. The powders collected were analyzed using X-ray diffraction (Warren-Averbach analysis) and BET. It was discovered that over 5 kilograms of tan colored cerium titanate powders were produced with a crystallite size of less than 20 nm and a specific surface area of greater than 20 m$^2$/gm. This example confirms that rare earth comprising titanate nanoscale powders can be manufactured.

EXAMPLE 6

Titanium Comprising Color Nanoparticles 99.5 weight % by metal pure iron octoate precursor from Shepard Chemicals was mixed with Titanium Tyzor® TOT precursor from DuPont (Fe:Ti ratio of 2:1), which was then diluted with acetic acid till the viscosity of the precursor was less than 200 cP. This mix was sprayed into a thermal plasma reactor described above at a rate of about 50 ml/min using about 150 standard liters per minute oxygen at sonic velocities. The peak vapor temperature in the thermal plasma reactor, processed at velocities greater than 0.25 mach, was above 3000 K. The vapor was cooled and then quenched by Joule-Thompson expansion. The powders collected were analyzed using X-ray diffraction (Warren-Averbach analysis) and BET. It was discovered that the powders had a crystallite size of less than 100 nm and a specific surface area of greater than 20 m$^2$/gm. The powders had a beautiful brown color.

This example shows that the teachings herein can produce color nanomaterials.

EXAMPLE 7

Non-stoichiometric Barium Titanium Oxide Nanoparticles

Barium Plastistab® precursor from OMGroup® and Titanium Tyzor® NPT from DuPont® were mixed by weight such that the metal content of Ba:Ti were in 1.05:1.0 non-stoichiometric molar ratios. This mix was sprayed into a DC thermal plasma reactor described above at a rate of about 100 ml/min using about 225 standard liters per minute oxygen. The peak vapor temperature in the thermal plasma reactor, processed at velocities greater than 0.25 mach, was above 3000 K. The vapor was cooled to nucleate nanoparticles and then quenched by Joule-Thompson expansion. About 5 kilograms of nanoscale powders were collected and analyzed using X-ray diffraction (Warren-Averbach analysis) and BET. It was discovered that the powders had a crystallite size of less than 100 nm and a specific surface area of greater than 7.5 $m^2/gm$. The powder matched the expected peaks for barium titanium oxide and had no detectable levels of barium oxide or titanium oxide. This example confirms that non-stoichiometric electroceramic nanoparticles can be manufactured.

EXAMPLE 8

Hydrophobic Nanoparticles

Titania nanoparticles produced in Example 3 were reacted with isobutyl trimethoxy silane (a compound comprising silicon) for 30 minutes at 90° C. and 15 minutes at 120° C. Before treatment the powders were hydrophilic. After the treatment with the silane, the powder was observed to be hydrophobic. In other experiments, isobutyl trimethoxy silane was replaced with other compounds comprising silicon, and these experiments produced hydrophobic nanoparticles as well. This example confirms that the titanium comprising nanoparticles taught herein can be utilized as reagents to prepare functionalized nanoparticles.

EXAMPLE 9

Resin Comprising Nanoparticles

Barium titanium oxide nanoparticles (sub-100 nanometers) were mixed with acrylic resin in a ratio sufficient to achieve 20% by weight nanoparticle comprising composite pellet. The resin and nanoparticles were mixed by shear mixing and then cured using an ultraviolet lamp. The pellet was solid and strong. Another pellet was prepared without nanoparticle. The measured hardness was found to be more than 10% higher in nanocomposite as compared to a pellet that was prepared from pure acrylic resin.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for preparing a composition of matter comprising:
   providing nanoparticles of a first composition comprising titanium; and
   reacting the nanoparticles with at least one compound,
   wherein the reacting creates a second composition of matter that differs from the first composition,
   wherein the first composition further comprises at least three elements.

2. The method of claim 1, wherein the first composition comprises at least one oxide.

3. The method of claim 1, wherein the at least one compound comprises nitrogen.

4. The method of claim 1, wherein the at least one compound comprises at least one halogen containing compound or at least one silicon containing compound.

5. The method of claim 1, wherein the at least one compound comprises at least one acid or at least one alkali.

6. The method of claim 1, wherein the at least one compound comprises hydrogen.

7. The method of claim 1, wherein the at least one compound has a form chosen from solids, liquids, gases, and plasmas.

8. The method of claim 1, wherein the at least one compound comprises carbon.

9. The method of claim 1, wherein the at least one compound comprises oxygen.

10. The method of claim 1, wherein the second composition comprises carbon.

11. The method of claim 1, wherein the second composition comprises hydrogen.

12. The method of claim 1, wherein the second composition comprises nitrogen.

13. The method of claim 1, wherein the second composition comprises at least one organic substance.

14. The method of claim 1, wherein the second composition comprises at least one inorganic substance.

15. The method of claim 1, wherein the reacting is conducted in an environment having a temperature above 400° C.

16. The method of claim 1, wherein the second composition comprises nanoparticles.

* * * * *